(12) United States Patent
George et al.

(10) Patent No.: US 6,756,594 B2
(45) Date of Patent: Jun. 29, 2004

(54) MICROMACHINED TUNED-BAND HOT BOLOMETER EMITTER

(75) Inventors: Thomas George, La Crescenta, CA (US); Daniel S. Choi, Los Angeles, CA (US); Eric Jones, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 283 days.

(21) Appl. No.: 09/771,447

(22) Filed: Jan. 26, 2001

(65) Prior Publication Data

US 2002/0096492 A1 Jul. 25, 2002

Related U.S. Application Data

(60) Provisional application No. 60/178,651, filed on Jan. 28, 2000.

(51) Int. Cl.[7] ............................................. G01N 21/61
(52) U.S. Cl. ..................................................... 250/343
(58) Field of Search ....................................... 250/343

(56) References Cited

U.S. PATENT DOCUMENTS

| | | | | |
|---|---|---|---|---|
| 4,874,572 A | * | 10/1989 | Nelson et al. | 376/256 |
| 4,896,039 A | * | 1/1990 | Fraden | 250/342 |
| 4,958,076 A | * | 9/1990 | Bonne et al. | 250/343 |
| 5,611,870 A | * | 3/1997 | Horne et al. | 136/253 |
| 5,838,016 A | | 11/1998 | Johnson | |

OTHER PUBLICATIONS

National Research Council, *Estimating losses from future earthquakes*; National Academy Press, Washington, D.C., 1989; pp. 61–63.

Akbar, Sheikh et al.; *Ceramic Materials May Revolutionize Automotive Emissions Control*; Ceramic Industry, Jun. 1996; pp. 32–38.
Chase, S.T. et al.; *Resonant array bandpass filters for the far infrared*; Jun. 1, 1983; Applied Optics; vol. 22, No. 11; pp. 1775–1779.
Gerritsen, H.J.; *The Application Infrared Emitting Semiconductor Diodes to the Detection of Various Gases*; 1983 International Gas Research Conference; pp. 54–63.
Hayes, John R.; *False Alarms*; Jan. 13, 1997; Forbes; p. 52.
Markus, Karen et al.; *MEMS: A Closer Look*; Jun. 1996; Sensors; pp. 4–7.
Mayer, Carolyn; *Home Alarms for Carbon Monoxide Recalled*; Mar. 19, 1999 Washington Post; 5 pp.
Özbay, E. et al.; *Double–etch geometry for millimeter–wave photonic band–gap crystals*; Sep. 26, 1994; Applied Physics Lett.; vol. 65, No. 13; pp. 1617–1619.

(List continued on next page.)

*Primary Examiner*—Constantine Hannaher
(74) *Attorney, Agent, or Firm*—Christie, Parker & Hale, LLP

(57) ABSTRACT

A device for utilizing an optical infrared emitter/detector to sense substances of interest is provided. The infrared emitter/detector comprises a single crystal semiconductor, photonic band gap structure which functions both as an infrared emitter, a narrow-band filter, and as a broad-band infrared bolometer detector to exert wavelength control directly on the active element emitter/detector surface using the periodic symmetry of the photonic band gap structure to produce narrow wavelength "forbidden" optical transmission bands or modes to sense the presence of a specified substance in the environment. A system and method for sensing specific substances using the optical infrared emitter/detector of this invention in a sensor device is also provided. Finally, a method of manufacturing the infrared emitter/detectors of the present invention is also provided.

37 Claims, 13 Drawing Sheets

OTHER PUBLICATIONS

Tracy, Paula; *AmeriGas fined, must give free carbon monoxide detectors;* Manchester (N.H.) Union Leader, Apr. 9, 1999, 2 pp.

Whipple, Charles T.; *Don't Make Waves, Control 'Em;* Mar. 1999; Photonics Spectra; pp. 110–116.

Yablonovitch, E.; *Photonic band–gap crystals;* 1993; J. Phys. Condens; Matter 5; pp. 2443–2460.

Yablonovitch, E.; *Photonic crystals;* 1994; Journal of Modern Optics; vol. 41, No. 2, pp. 173–194.

Yablonovitch, E. et al.; *Photonic Band Structure: The Face–Centered–Cubic Case;* Oct. 30, 1989; Physical Review Letters; vol. 63, No. 18; pp. 1950–1953.

*Estimating losses from future earthquakes: Chapter 7 Indirect Losses;* Panel on Earthquake Loss Estimation Methodology, Committee on Earthquake Engineering, Commission on Engineering and Technical Systems, National Research Council; 1989; National Academy Press, Washington, D.C., pp. 61–63.

Aagard, R.; *Development of a Selective Natural Gas Detector;* Mar. 1987, Government Institutes, Inc.; Proceedings of the 1986 International Gas Research Conference; Toronto, Canada; pp. 184–194.

Baer, D.S. et al.; *Advanced Diode–Laser Absorption Sensors for Combustion Monitoring and Control;* Nov. 1988; Proceedings of the SPIE, vol. 3535; pp. 16–23.

Barnes, W.L. et al.; *Photonic gaps in the dispersion of surface plasmons on gratings;* Apr. 15, 1995; Physical Review B; vol. 51, No. 16; pp. 164–168.

Blatchley, Charles C., et al.; *Rugged dark materials for stray light suppression by seeded ion beam texturing;* 1992; Proceedings of the SPIE: Stray Radiation in Optical Systems II; vol. 1753; pp. 317–326.

Byrne, Dale M.; *Diffractive Infrared Filters Fabricated by Electron–beam Lithography;* Aug. 1985; Proceedings of SPIE: Diffraction Phenomena in Optical Engineering Applications; vol. 560; pp. 70–81.

Byrne, D.M., et al.; *Infrared mesh filters fabricated by electron–beam lithography;* Jan./Feb. 1985; J. Vac. Sci. Technology B; vol. 3, No. 1, pp. 268–271.

Campbell, Ian C.; *Fail–Safe Control for Gas Distribution Systems: The Need for Gas Protection in the Urban Environment;* Jul. 1997; Proceedings of the High Consequence Operations Safety Symposium II, Surety Assessment Center, Sandia National Laboratories; pp. 1 to 9.

Feiertag, G. et al.; *Fabrication of photonic crystals by deep x–ray lithography;* Sep. 1997; Applied Phys. Lett.; vol. 71; No. 11, pp. 1441–1443.

Ghaemi, H.F., et al.; *Surface plasmons enhance optical transmission through subwavelength holes;* Sep. 1998; Physical Review B; vol. 58, No. 11; pp. 6779–6782.

Gruning, U., et al., *Macroporous silicon with a complete two–dimensional photonic band gap centered at 5 µm;* Feb. 1996; Applied Phys. Lett.; vol. 68; No. 6; pp. 747–749.

Grupp, D.E., et al.; *Crucial role of metal surface in enhanced transmission through subwavelength apertures;* Sep. 2000; Applied Physics Letters; vol. 77, No. 11; pp. 1569–1571.

Hayes, John R.; *False Alarms;* Jan. 1997; Forbes; vol. 159; No. 1; p. 52.

Kryliouk, O.M., et al.; M*OCVD Growth of GaN Films on Lattice–Matched Oxide Substrates;* Dec. 1996; Materials Research Society, Proceedings of the Fall Meeting; vol. 449; pp. 123–128.

Lin, H.–B., et al.; *Observations of two–dimensional photonic band behavior in the visible;* May 1996; Applied Physics Lett.; vol. 68, No. 21; pp. 2927–2929.

Markus, Karen et al.; *MEMS: A Closer Look: Part 1: Proliferation and Promise;* Jun. 1996; Sensors; pp. 4–7.

McCall, S.L. et al.; *Microwave Propagation in Two–Dimensional Dielectric Lattices;* Oct. 1991; Phys. Rev. Lett.; vol. 67, No. 15; pp. 2017–2020.

Tracy, Paula; *AmeriGas fined, must give free carbon monoxide detectors;* The Union Leader; Manchester, NH; Apr. 9, 1999, Section A; p. 1.

Wolfe, John C.; *A proximity ion beam lithography process for high density nanostructures;* Nov./Dec. 1996; J. Vac. Sci. B; vol. 14; No. 6; pp. 3896–3899.

Yablonovitch, E.; *Photonic band–gap crystals;* Mar. 1993; J. Phys. Condens; Matter; vol. 5; pp. 2443–2460.

Yablonovitch, E.; *Photonic band–gap structures;* Feb. 1993; J. Opt. Soc. Am. B; vol. 10, No. 2; pp. 283–295.

Yablonovitch, E. et al.; *Donor and Acceptor Modes in Photonic Band Structure;* Dec. 1991; Physical Review Letters; vol. 67, No. 24; pp. 3380–3383.

Yablonovitch, E. et al.; *Photonic Band Structure: The Face–Centered–Cubic Case Employing Nonspherical Atoms;* Oct. 1991; Physical Review Letters; vol. 67, No. 17; pp. 2295–2298.

Yablonovitch, Eli; *Inhibited Spontaneous Emission in Solid–State Physics and Electronics;* May 1987; Physical Review Letters; vol. 58, No. 20; pp. 2059–2062.

* cited by examiner

FIG. 1A
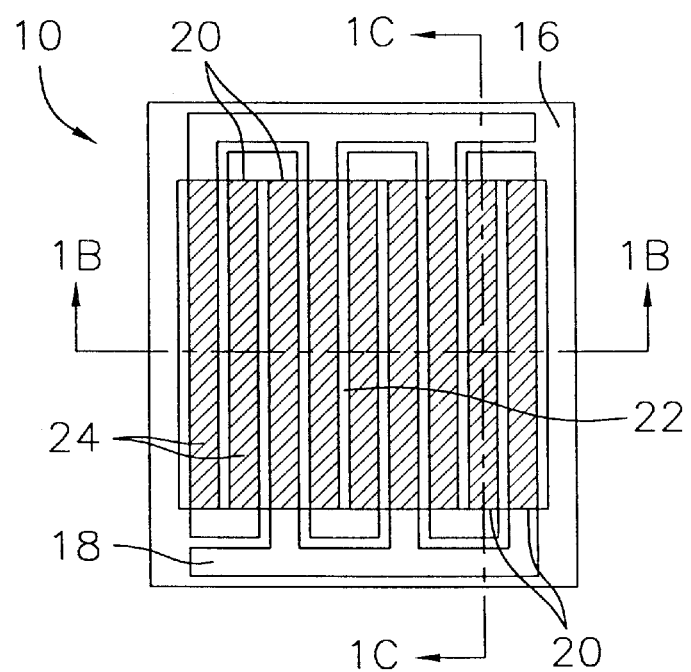
FIG. 1C
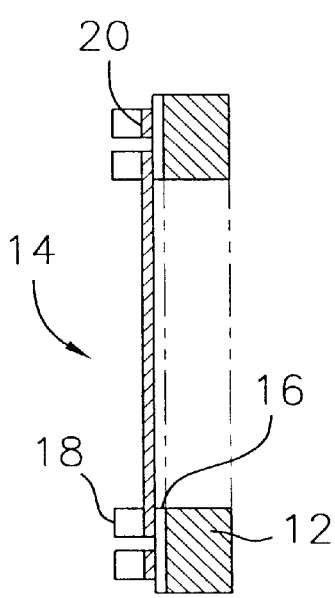
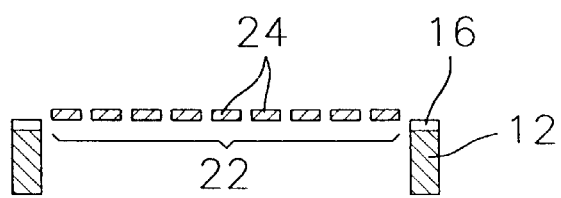
FIG. 1B

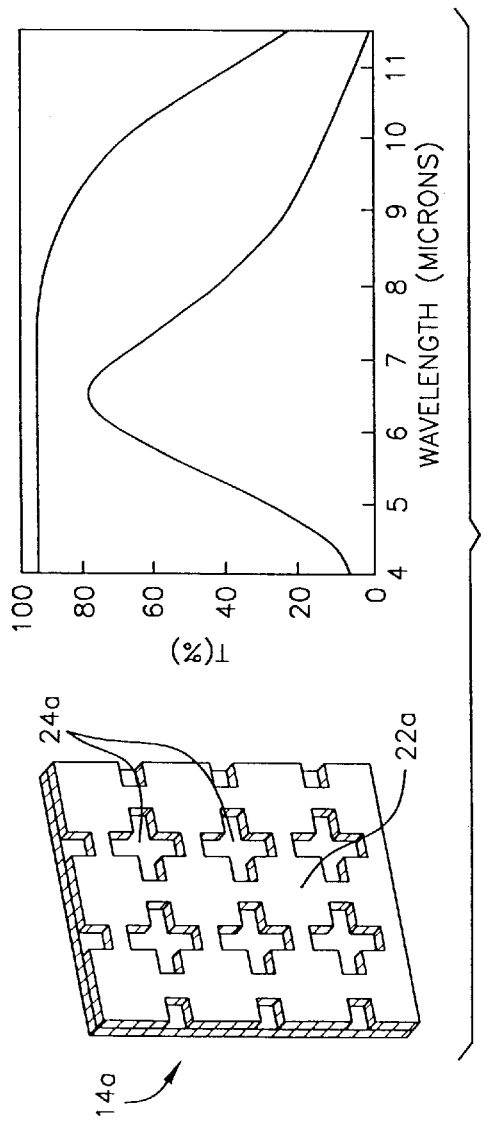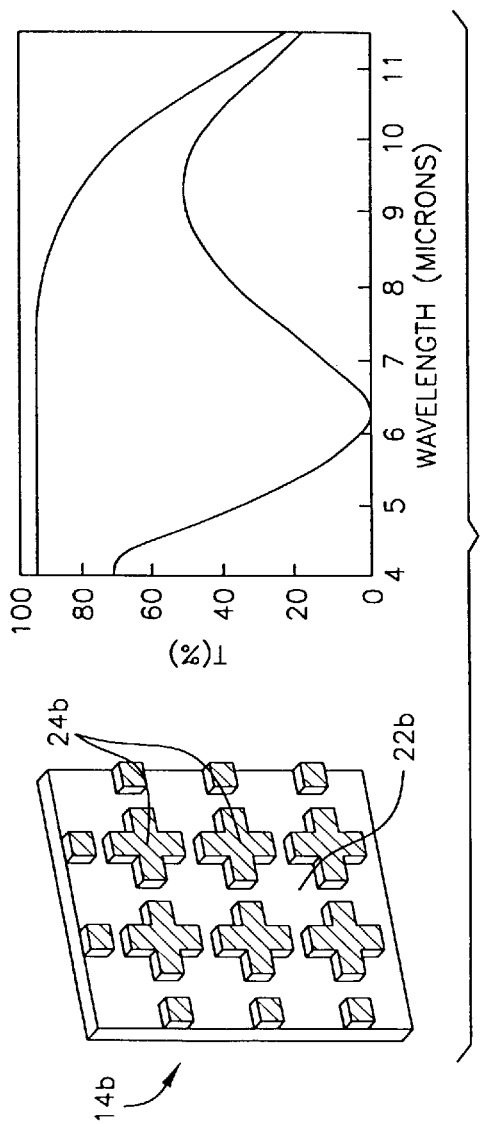

MICROMACHINED TUNED-BAND HOT BOLOMETER EMITTER

CROSS-REFERENCE TO RELATED APPLICATION(S)

This application is based on U.S. Application No. 60/178,651, filed Jan. 28, 2000, the disclosure of which is incorporated by reference.

STATEMENT REGARDING FEDERALLY SPONSORED RESEARCH

The U.S. Government has certain rights in this invention pursuant to grant No. DMI-9860975, awarded by the National Science Foundation; Advanced Technology Program contract No. ATP-99-01-2051, awarded by the National Institute of Science and Technology; and sponsorship by the National Aeronautics and Space Administration under grant No. NAS 7-1407, Office of Space Science.

FIELD OF THE INVENTION

The present invention is directed to an micromachined infrared absorption emitter/sensor for detecting the presence of specific chemical and/or biological species.

BACKGROUND OF THE INVENTION

This invention relates in general to micromachined infrared emitter sensors or a "sensor-on-a-chip" and in particular to micromachined infrared emitter/bolometer sensors for detecting and discriminating the presence of specific biological, chemical, etc. substances comprising a heated bolometer integrated circuit element as a source of infrared emission, a filter for controlling the wavelength of emitted light and a detector of the absorption of the emitted light by a substance interacting with the emitted light.

There is a very serious demand and need for low-cost, mass market gas and chemical sensors, such as, for example, indoor natural gas, radon and carbon monoxide (CO) sensors. In the United States alone nearly 300 people die and thousands are injured from unintentional carbon monoxide poisoning every year. Such mass market sensors must be both hardy and sensitive. For example, CO concentrations of only 50 ppm can produce symptoms of carbon monoxide poisoning over a period of time while CO concentrations of 2000 to 2500 ppm will produce unconsciousness in about 30 minutes and higher CO concentrations can kill. As a comparison, typical gasoline-powered auto exhaust contains anywhere between 300 to 500 ppm concentrations of CO. The need for natural gas sensors, meanwhile, was highlighted most recently in the devastating fires that followed earthquakes in Northridge, Calif. and Kobe, Japan leading to a call for natural gas distribution systems to incorporate sensors in combination with automatic shut-off valves.

Currently the market for small, low-cost CO sensors is served by either catalytic or electrochemical sensors. Catalytic sensors use optical measurements to observe chemical, enzyme or bioengineered coatings that react, very specifically, to a substance of interest such as, for example, carbon monoxide. Despite the sensitivity and specificity of these detectors, inherent limitations reduce their utility in a mass market. For example, the catalytic element on these sensors requires periodic replacement, raising use cost and increasing the likelihood that the sensor will fail as a result of poor maintenance or high levels of contaminants.

Electrochemical sensors measure a change in output voltage of the sensing element due to interaction of the species of interest on the sensing element. While these electrochemical sensors are inexpensive and very sensitive, they are also historically subject to interference and false alarms due to chemical species other than that sought interacting with the sensing element. In addition, these sensors respond slowly and the response is not always reversible. Indeed, exposures to high concentrations of the species of interest can result in a permanent shift of the zero-point requiring a re-calibration of the unit. Furthermore, temperature and humidity changes frequently cause drift and false readings, and outgassing from the plastic and cardboard in which the detectors are packaged can also contaminate the sensors prior to actual sale to the consumer. Moreover, in many of these devices the detector element must be heated, and current consumer models require about 5 watts of continuous power. Although the cost of such usage per annum is low, these sensors' reliance on a steady source of power results in sensor failure if there is a power outage, when the sensor may be needed the most.

Despite these limitations, over 20 million American homes have installed CO monitors utilizing either a catalytic or electrochemical sensor. However, recently, a number of articles have appeared pointing out that a very high percentage of alarms triggered by available CO sensors are false alarms and that a very high percentage of sensors don't set off alarms when appropriate. See, e.g., "Home Alarms for Carbon Monoxide Recalled", *Washington Post*, Mar. 19, 1999; "ULC Investigation Indicates Failures of Certain Lifesaver and Nighthawk CO Detectors", *Canada Newswire, www.newswire.ca/releases/*Mar. 19, 1999/c5815.html; "AmeriGas fined, must give free carbon monoxide detectors," *Manchester* (N.H.) *Union Leader*, Apr. 9, 1999; "False Alarms", *Forbes Magazine*, Jan. 13, 1997; "Carbon Monoxide Alarms Recalled", USA Today, Mar. 19, 1999. The Gas Research Institute estimates that more than 80% of emergency calls triggered by CO sensors are false alarms and as many as 20% of the CO sensors sold in 1999 were recalled as defective.

One avenue of sensor development currently being investigated uses diode lasers for optical detection techniques. While this technique is again highly sensitive and less subject to contamination and false alarms than catalytic or electrochemical sensors, the units presently cost too much for home installation. In addition, because they depend on physical band-gaps, diode lasers can only be tuned with difficulty over a very narrow range. Moreover, there are no uncooled diode lasers and only low efficiency, low output (~5 $\mu$W), expensive (~$450) LEDs available at the wavelengths (~2–6 $\mu$m) for gas sensing.

Another detector technology currently under study utilizes infrared spectroscopy to detect species of interest. Many hazardous and pollutant gases (e.g., volatile organic compounds, carbon dioxide, nitrogen oxides, and sulfur dioxide) have unique infrared absorption signatures in the 2 to 12 $\mu$m region of the infrared. In general, infrared absorption is a function of the wavelength, gas concentration, temperature and pressure such that if the concentration of the species of interest is low enough to be considered dilute, then the absorption is directly proportional to the concentration. In addition, by observing a reference wavelength corrections can be easily made for contaminants, such as, for example, dust. While sensors designed to take advantage of the sensitivity and resolution of infrared spectroscopy are well-known in the art and are frequently used for industrial application, such as, for example, automotive exhaust, refrigerants and glucose monitors, the size and complexity of the infrared sensor unit has precluded their use in the mass-market. Conventional infrared gas and chemical sensors are expensive, high performance units consisting of a cabinet full of discrete components. For example, one type of conventional infrared sensor employs a multi-component design. In this design an infrared light source, usually a blackbody emitter, such as, for example, a Nernst glow bar or tungsten filament modulated by a mechanical chopper, serves as a source of infrared radiation. The radiation is directed through a sample compartment containing the sample gas or liquid to be measured or tested and then the radiation is directed to a separated monochromator and infrared detector and amplifier. The radiation is analyzed as intensity vs. wavelength, either by a spectrometer or by detectors with narrow-band interference filters. Much of the bulk and cost of these conventional infrared instruments is designed to maintain optical alignment in the face of varying ambient conditions and in spite of the expense and effort these instruments frequently require re-calibration and/or realignment.

Recently, photonic band gap structures, such as periodic dielectric arrays, have received much attention as optical and infrared filters with controllable narrow-band infrared absorbance. These photonic structures have been developed as transmission/reflection filters, low-loss light-bending waveguides, and for inhibiting spontaneous emission of light in semiconductors which could lead to zero-threshold diode lasers. In principle these photonic band gap structures operate as follows: electromagnetic waves with wavelength on the order of the period of the dielectric array propagate through this structure, the light interacts in a manner analogous to that for electrons in a periodic symmetric array of atoms. Thus the structure exhibits allowed and forbidden extended states, a reciprocal lattice, Brillouin zones, Bloch wavefunctions, etc. Recently these structures have even been used to create narrow-band infrared radiators. Emissivity of these metal filaments is controlled by creating random surface texture (sub-micron scale rods and cones) which modifies the surface absorption spectrum. Incoming light of wavelengths that are small compared to the feature sizes are scattered from the surface, producing high emissivity, whereas light of wavelengths that are long compared to the feature sizes are not scattered, producing low emissivity. Accordingly, by controlling the average feature size at the surface of these photonic bandgap structures, the wavelength of the emitted light can be controlled. One such infrared radiator is manufactured and distributed by IonOptics under the name pulsIR®. The pulsIR® infrared emitter utilizes an ion beam etched-randomly textured surface structure which shows increased optical adsorption over a defined wavelength range and also shows preferential emission over the same waveband when heated. The emitted infrared spectrum is essentially a modified black-body spectrum and provides far more infrared signal for a fixed power input within a narrow infrared band than standard black-body lamps.

Despite the promise that photonic band gap structures exhibit in terms of size and stability, most researchers have only utilized them as tuned absorbers or filters and not as emitters. Accordingly, significant limitations exist in the quantum efficiency and output power of currently available photonic band gap emitters which emit in a wavelength band typically of $\Delta\lambda/\lambda \sim 0.5$, limiting their feasibility for use in portable battery operated systems. Additionally, the photonic bandgap emitters currently produced require a separate infrared emitter, detector, wavelength filter and optics to make spectroscopic measurements, driving up the cost and complexity of the resulting infrared sensor system.

Accordingly, a need exists both for a low-cost mass market sensor system capable of accurately and sensitively detecting and discriminating the presence of specified substances in the environment and for an improved infrared sensor capable of meeting the demands of the mass market.

SUMMARY OF THE INVENTION

The present invention is directed to a device and system for utilizing an optical infrared emitter/detector to sensitively sense substances of interest. This invention utilizes a photonic bandgap structure which functions both as an infrared emitter, a narrow-band filter, and as a broad-band infrared bolometer detector to sense the presence of a specified substance in the environment. This invention also uses the photonic band gap structure to exert wavelength control directly on the active element emitter/detector surface using the periodic symmetry of the photonic band gap structure to produce narrow wavelength "forbidden" optical transmission bands or modes. This invention is also directed to systems for integrating the optical infrared emitter/detector of this invention into a device for sensing specific substances. This invention is also directed to novel methods for detecting a wide range of substances using the infrared emitter/detector of the invention. This invention is also directed to a method of manufacturing the infrared emitter/detectors of the present invention.

In one embodiment, the optical infrared emitter/detector of the present invention is incorporated into an infrared sensor comprising a thermally isolated version of the narrow-band emitter/bolometer detector of the current invention and a reflector. The narrow-band emitter/bolometer detector is designed to emit a narrow-band of infrared light and detect a change in the temperature of the infrared light reflected back onto the emitter/detector by the reflector. The emitter/detector is placed in line-of-sight with the reflector such that the intervening space between the emitter/detector and reflector comprises the optical cell. The emitter/detector then projects a beam of infrared light across the optical cell to the reflector, the reflector then sends the light back toward the emitter/detector. In the absence of any absorption in the optical cell by the species of interest, the filament and optics quickly reach a thermal equilibrium. Absorbing gas in the optical cell will reduce the reflected optical power returning to the element and it will reach equilibrium with its surroundings at a slightly lower temperature. This change in the equilibrium temperature is detected as a change in the resistance of the emitter/detector bolometer. The emitter/detector is modified such that it emits infrared light in a narrow wavelength band in the spectral region in which the substance of interest absorbs.

In such a sensor system, the emitter/detector comprises a substrate having a thin, non-random, periodic array of etched metal (or photonic band gap (PBG) structure) atop the emitting surface of the substrate wafer such that the wavelength of emitted light from the emitter surface is proportional to the spacing of the geometric patterns of the non-random periodic array of etched metal on the substrate's surface. The substrate wafer is preferably made of a material having a high temperature coefficient of resistance such that a small change in equilibrium temperature results in a disproportionately large shift in substrate resistance.

In a preferred embodiment, the substrate is made of a semiconductor such as, for example, silicon and the periodic array is preferably made of a conducting metal such as gold. In this embodiment the silicon can be further doped to adjust the final device resistance and therefore the required drive current and battery life.

In another preferred embodiment, the substrate is made of single crystal semiconductor having a resistance that has an exponential dependence on the temperature of the filament such as, for example, silicon. Utilizing such a material, allows for far more sensitive bolometric detection than a similar detector based on metals, which generally exhibit a linear dependence of resistance with temperature.

In another preferred embodiment, the size, shape and pattern of the photonic band gap structure etched on the substrate wafer is adapted such that the absorbance of the sensor is enhanced in a narrow-band wavelength corresponding to the absorption wavelength for a species of interest, such as, for example, CO at a wavelength between 4.65 and 3.9 $\mu$m.

In yet another preferred embodiment, the infrared sensor of the present invention further comprises a reflective optic adapted such that infrared light emitted from the emitter/detector is collimated into a concentrated beam of light prior to entering the optical cell and infrared light reflected back into the emitter/detector from the reflector is refocused prior to reaching the emitter/detector. In this embodiment a preferred reflective optic is a compound parabolic concentrator.

In yet another preferred embodiment the infrared sensor system of the present invention comprises an emitter/detector in signal communication with an monitoring device such that when the emitter/detector detects the presence of the species of interest a signal is sent to the monitoring device, such as, for example, a programmable chip in signal communication with an audible alarm.

In still yet another embodiment, the invention is directed to a system for the detection of substances comprising multiple emitter/detectors as described above, adapted to either detect the same or different species of interest each of which is in signal communication with at least one monitoring device as described above.

In still yet another additional embodiment, the invention is directed to a method for detecting and discriminating a substance in contact with the infrared sensor. The method comprises analyzing the air in an environment using a infrared sensor as described above.

In still yet another additional embodiment, the invention is directed to a method for manufacturing the infrared sensor as described above. The method comprising manufacturing the emitter/sensor using conventional microelectromechanical (MEMS) manufacturing techniques, such as, for example, electron beam lithography techniques.

In still yet another embodiment, the invention is directed to a method for manufacturing the infrared sensor as described above. The method involves the use of silicon-on-insulator (SOI) or silicon-oxide-silicon (SOS) substrates, whereby single crystal silicon films are used to produce the high sensitivity detectors.

BRIEF DESCRIPTION OF THE DRAWINGS

These and other features and advantages of the present invention will be better understood by reference to the following detailed description when considered in conjunction with the accompanying drawings wherein:

FIG. 1a is a schematic view of an embodiment of the emitter/detector according to the invention.

FIG. 1b is a cross-sectional view of an embodiment of the emitter/detector according to the invention.

FIG. 1c is a cross-sectional view of an embodiment of the emitter/detector according to the invention.

FIG. 2a is a schematic view comparing an embodiment of emitter/detector with and without the photonic band gap structure according to the invention and corresponding comparative test data.

FIG. 2b is a schematic view comparing an embodiment of emitter/detector with and without the photonic band gap structure according to the invention and corresponding comparative test data.

DETAILED DESCRIPTION OF THE INVENTION

Figure 3:
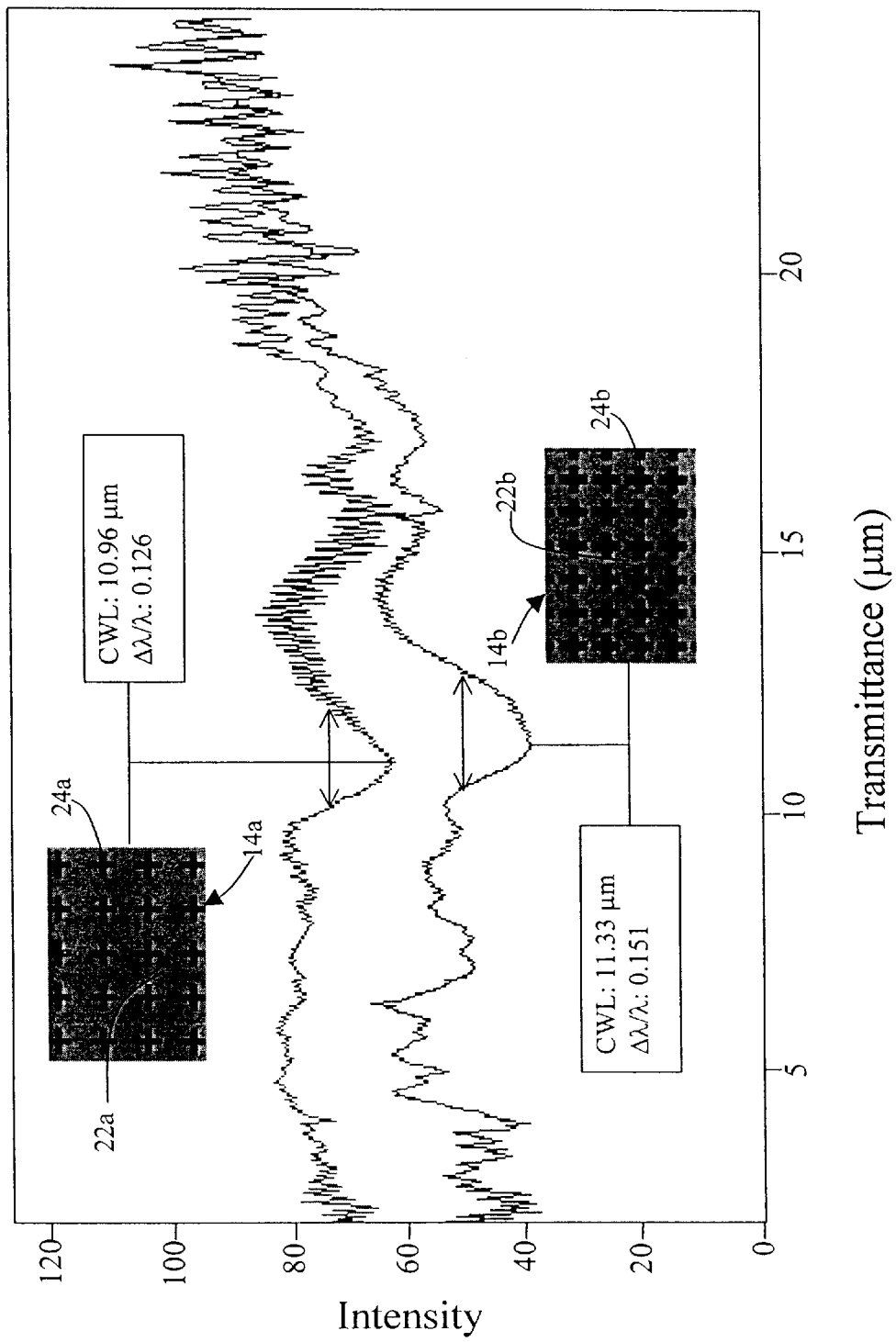
FIG. 3 is a comparative graphical representation of the infrared emission and detection properties of two embodiments of the present invention.

The present invention is directed to a sensor engine comprising a micromachined infrared emitter bolometer detector for detecting and discriminating species in an environment. In one embodiment, as shown in FIGS. 1a to 1c, the "sensor engine" or micromachined infrared emitter bolometer detector 10 comprises a substrate 12, a micromachined heated filament infrared emitter source/bolometer detector element fabricated in a single-crystal semiconductor film 14, an insulator 16 aligned between the substrate 12 and the emitter/detector element 14 to provide electrical isolation, a bus bar 18 in electrical communication with a power source (not shown) and a pair of contacts 20 in electrical communication with the emitter/detector element 14 to provide power to the emitter/detector element 14. The insulator 16 can be made of any substance capable of electrically isolating the substrate 12 from the emitter/detector element 14, such as, for example an insulating oxide. The bus bar 18 and contact points 20 can be made of any suitable conductor such that power is transmitted from the power source to the emitter/detector element 14, such as, for example, copper, aluminum or gold.

The emitter/detector element 14 comprises a micromachined periodic dielectric array 22 comprising an ordered repeating pattern of dielectric array features 24 arranged on the single-crystal semiconductor surface of the emitter/detector element 14. In the embodiment shown in FIGS. 1a to 1c, the periodic dielectric array 22 comprises a series of micromachined long thin filaments 24 attached to the bus bar 18 in series via the contacts 20. The emitter/detector element 14 can be made of any material suitable for resistive heating, such as, for example, metallized single-crystal silicon substrate. In turn, any suitable conducting metal can be used to metallize the surface of the emitter/detector element 14, such as, for example, gold, aluminum or titanium. In operation, power is supplied to the emitter/detector element 14 via contact points 20 between the bus bar 18 and the emitter/detector element 14. The application of power to the emitter/detector element 14 causes the resistive emitter/detector element 14 to heat up producing an infrared emission 26 having a narrow-band wavelength corresponding to the absorption wavelength of the species of interest. This narrow-band infrared emission 26 is then projected across an optical path (not shown) containing the sample gas, is reflected back onto the emitter/detector element 14 by a reflector (not shown) and impinges on the emitter/detector element 14. In the absence of species that absorb in the wavelength of the emission radiation 26 the emitter/detector element 14 reaches a thermal equilibrium with the infrared emission 26. However, the presence of absorbing gas in the optical cell will reduce the reflected optical power of the infrared emission 26 returning to the emitter/detector element 14 and the temperature of the emitter/detector element 14 will be proportionately reduced. The change in temperature of a conductor emitter/detector element 14 upon external absorption of the infrared emission 22 can be measure by measuring the change in resistance of the emitter/detector element 14 across the bus bar 18, the change in resistance per degree change in temperature being determined by the materials temperature coefficient of resistance (TCR). Thus, any substrate having a suitably high TCR, in which the change in resistance is large compared to the temperature change, may be utilized to create the emitter/detector element 14 of the current invention, such as, for example, a semiconductor substrate such as a wafer of very high crystalline quality silicon or a silicon-on-insulator (SOI) or silicon-oxide-silicon (SOS) wafer. As a comparison, a standard conductive titanium filament heated to 900K has a resistivity of 160 Ω-cm and a TCR of 0.0612 Ω-cm/K according to the equation:

$$R = R_0[1 + \alpha(T - T_0)] \quad (1)$$

where R is the resistance of the emitter/detector element 14 at temperature T, 60 is the temperature coefficient of resistance and $R_0$ is the resistance of the emitter/detector element 14 at temperature $T_0$ or 20° C. As such, a 1% change in temperature of the filament results in a 0.3% change in the resistance of the filament. In contrast, the resistivity of a semiconducting material changes exponentially with the temperature, thus a filament fabricated from single crystal silicon exhibits a 25× larger relative change in resistance.

It will be understood that the design of the periodic dielectric array 22 of a particular emitter/detector element 14 according to the present invention is necessarily driven by the species of interest, as the wavelength and linewidth of the emission radiation 26 sensitively depend on the geometrical size, shape and spacing of the dielectric array features 24. The emitter/detector element 14 has two characteristic sizes: (1) the surface texture feature size (0.1–2 mm) which determines the emission wavelength and bandwidth and (2) the filament linear dimensions which are on the order of ~0.1–10 mm. Using an iterative process, the micron-scale dielectric array features 24 can be optimized to tune the emission wavelength, then select operating temperature, resistance and mechanical properties to optimize operation. Accordingly, although the dielectric array features 24 of the embodiment shown in FIGS. 1a to 1c comprise a plurality of thin strips 24, it should be understood that any shape, size or spacing of periodic dielectric array features 24 can be utilized in the emitter/detector element 14 of the current invention such that the wavelength and linewidth of the emission radiation 26 generated by the emitter/detector element 14 is suitable for use as a spectroscopic source for the species of interest. For example, in one embodiment the dielectric array features may be crosses, squares, circles, pyramids, or rectangles, as desired.

The emission source of the emitter/detector element 14 is the artificially engineered periodic dielectric array 22 in which the propagation of the electromagnetic radiation 26 is governed by band structure-like dispersion. The periodic dielectric array 22 exerts control over the wavelength and linewidth of the emission radiation 26 in a manner analogous to that for electrons in a periodic symmetry of atoms, i.e., the periodic dielectric arrays 22 exhibit "allowed" and "forbidden" extended states, reciprocal lattice, Brillouin zones, Bloch wavefunctions, etc. When emission radiation 26 with wavelength on the order of the period of the periodic dielectric array 22 propagate through the emitter/detector 14, the light interacts with the periodic dielectric array features 24 and the resulting emission radiation 26 is governed by band structure-like dispersion. Accordingly, for wavelengths small compared to feature sizes, the surface scatters incoming light and has high emissivity (>80%), while for wavelengths long compared to the feature sizes, the surface has low emissivity, characteristic of a flat metal (<0.1).

FIGS. 2a and 2b illustrate the spectral control of the linewidth of the emission radiation 26 attainable by manipulating the structure, and dimensions of the periodic dielectric array 22 of the emitter/detector element 14. Schematic views of two emitter/detector elements 14a and 14b having periodic dielectric arrays 22a and 22b comprising inductive 24a and capacitive 24b cross-shaped dielectric array features are shown. Emission spectrum of the bare substrates 12 of the two emitter/detectors 14a and 14b, as described by the Planck function (top line of plots), and the absorption spectrum of the emission radiation 26 as modulated by the two cross-shaped periodic dielectric arrays 22a and 22b (bottom line of plots) are also provided. As shown, the wavelength of the emitted infrared emission radiation 26 produced by the emitter/detector element 14a and 14b is narrowed significantly with the addition of the periodic dielectric arrays 22a and 22b. This narrowing of the linewidth of the emission radiation 22 is important because the sensitivity and noise rejection of the emitter/detector element 14 depends on the linewidth of the infrared emission 26, i.e., the ratio between the in-band signal strength to the overall thermal budget of the emitter/detector element 14 ($\Delta\lambda/\lambda$), peak absorption wavelength and spectral purity (linewidth) correlate with the periodic dielectric array feature 24 size and spacing as well as surface conductivity. By manipulating the periodic dielectric array 22 of the current invention, emitter/detector elements 14 can be produced having emission radiation 26 linewidths as low as $\Delta\lambda/\lambda\sim0.1$ $\mu m$.

The wavelength of the emission radiation can also be controlled by manipulating the size, shape and spacing of the dielectric array features 24 of the periodic dielectric arrays 22 of the emitter/detector elements 14 of the current invention. The variability of the wavelength of the emission radiation 26 with dielectric array feature 24 size and spacing is illustrated in FIGS. 3 to 5a and 5b. In FIG. 3, the emission spectra from two emitter/detector elements 14a and 14b having periodic dielectric arrays 22a and 22b comprising two different cross-shaped dielectric array features 24a and 24b are shown. The top curve of the emission spectrum is obtained from periodic dielectric array 22a having dipole cross dielectric array features 24a with dimensions of 5.7 $\mu m$ wide on 9.5 $\mu m$ centers with 1.4 $\mu m$ line widths. The bottom curve of the emission spectrum is obtained from periodic dielectric array 22b having dipole cross dielectric array elements 24b with dimensions of 6.0 $\mu m$ wide on 7.1 $\mu m$ centers with 2.2 $\mu m$ line widths. As shown, while both emitter/detector elements 14a and 14b shown enhanced absorbance near 11 $\mu m$, there is a shift in the peak intensity of ~0.3 $\mu m$ with a linewidth of between ~0.126 and 0.151 $\mu m$. Thus, this comparative spectrum indicates that the wavelength of the emitted light can be tuned based simply on the size and spacing of the dielectric array features 24 present on the emitter/detector element 14.

Figure 4:
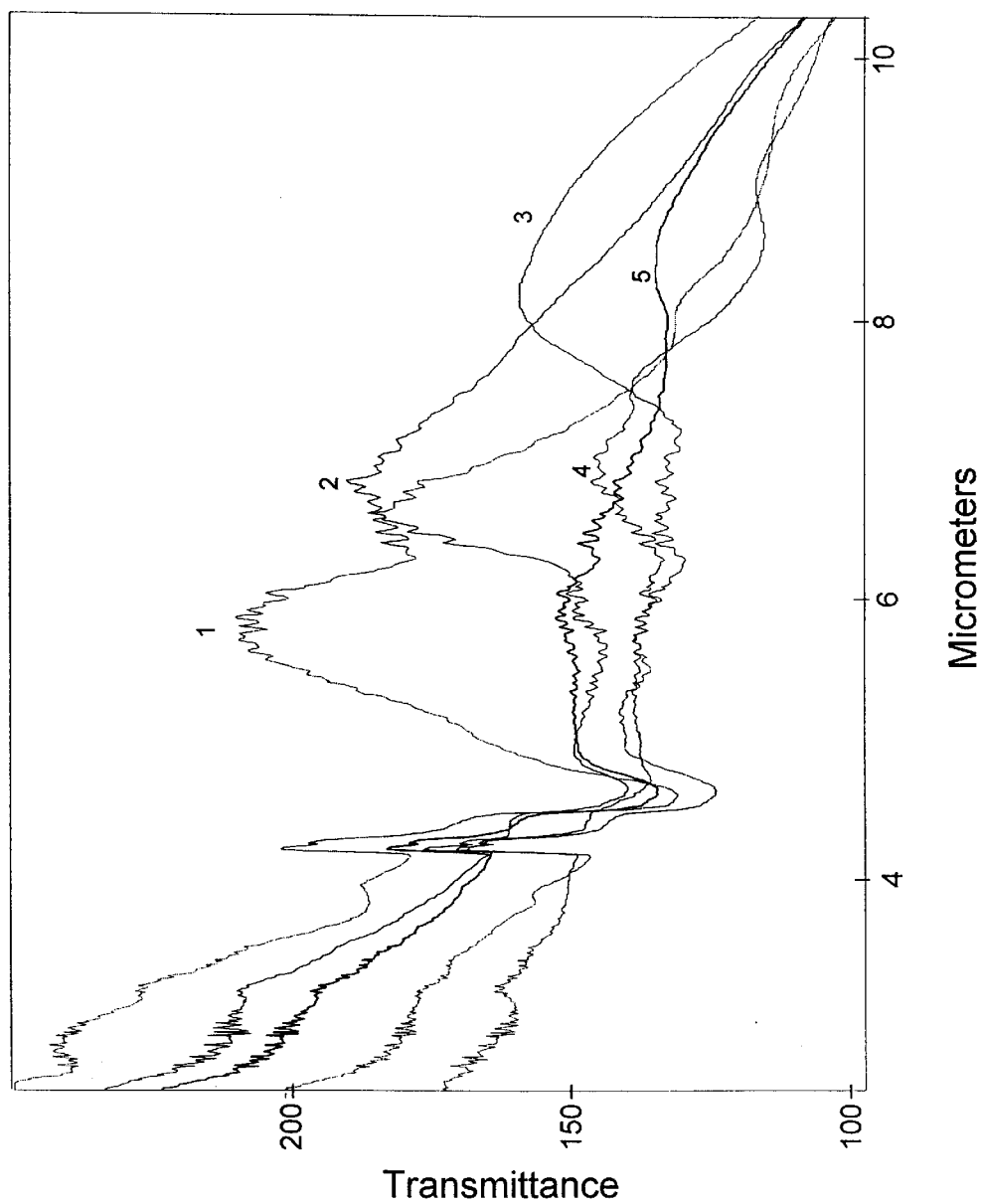
FIG. 4 is a comparative graphical representation of the infrared emission and detection properties of the present invention.
Figure 5A:
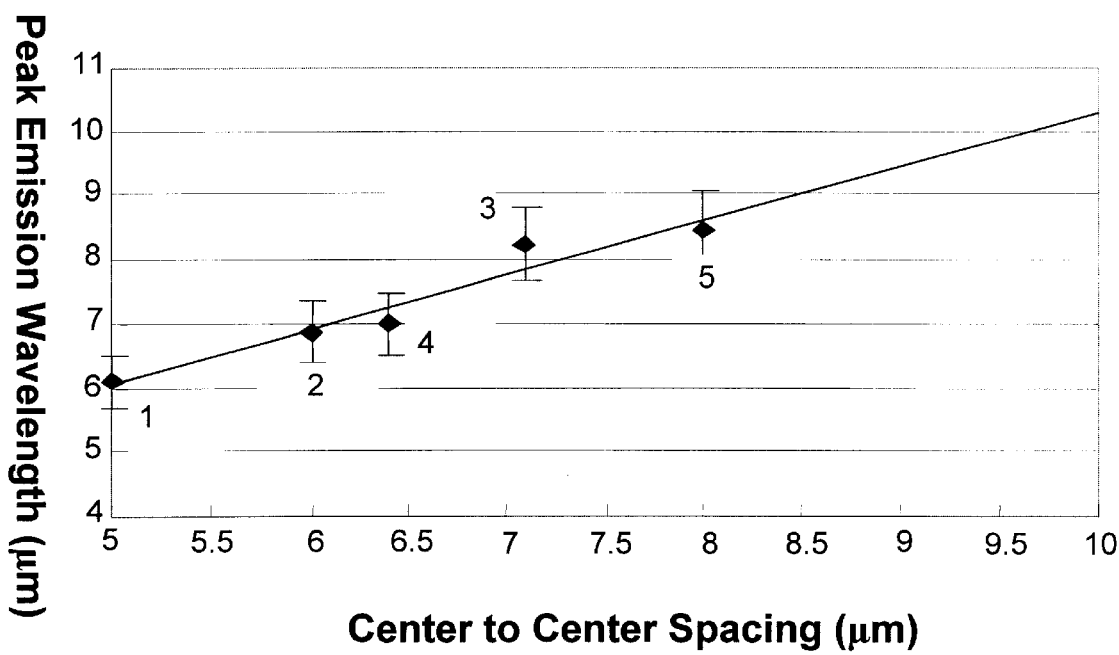
FIG. 5a is a comparative graphical representation of the infrared emission and detection properties of the present invention.
Figure 5B:
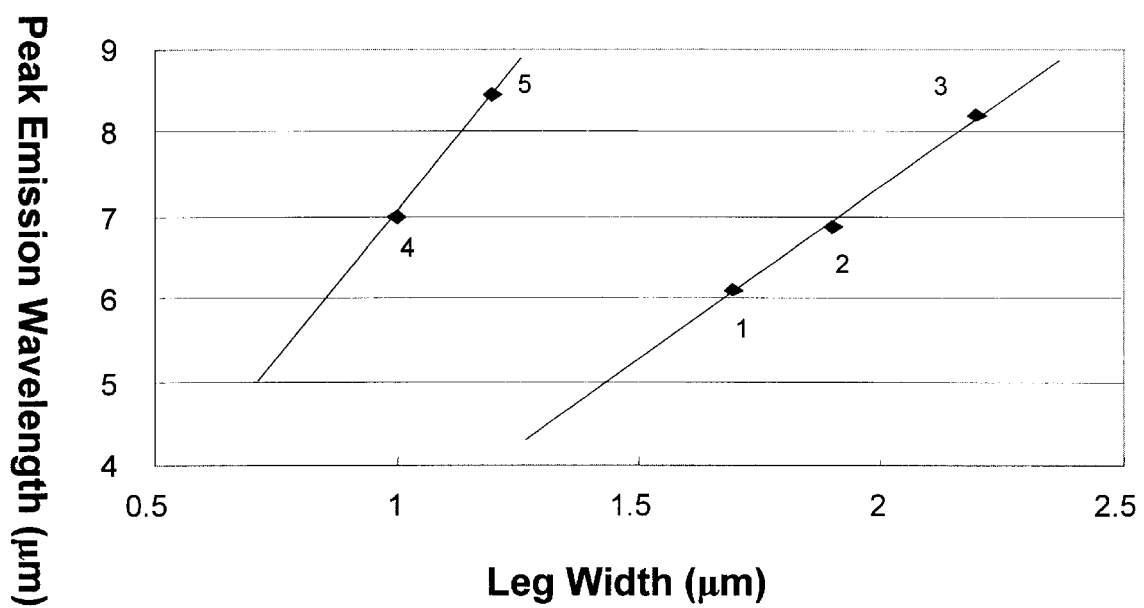
FIG. 5b is a comparative graphical representation of the infrared emission and detection properties of the present invention.

FIGS. 4, 5a and 5b present additional spectra showing the tunability of the emission radiation 26 wavelength for sizes and spacings of dipole crosses dielectric array features 24 having dimensions as listed in Table 1, below.

TABLE 1

Cross Dipole Dielectric Array Features

| Pattern # | cross length ($\mu m$) | line width ($\mu m$) | center-to-center spacing ($\mu m$) |
|---|---|---|---|
| 1 | 4.0 | 1.7 | 5.0 |
| 2 | 5.0 | 1.9 | 6.0 |
| 3 | 6.0 | 2.2 | 7.1 |
| 4 | 3.8 | 1.0 | 6.4 |
| 5 | 4.8 | 1.2 | 8.0 |

FIG. 4 shows five spectra from thermal emittance measurements taken at 500° C. for aluminum-coated n⁻ silicon emitter/detectors 10. As shown in FIG. 4, and summarized in FIGS. 5a and 5b, altering the center-to-center spacing and leg width results in a systematic shift in the peak emission wavelength. Accordingly, the specific wavelength and line width of the narrow-band emission radiation 26 of an emitter/detector element 14 can be controlled by designing sub-micron scale dielectric array features 24.

Figures 6A, 6B, 6C:
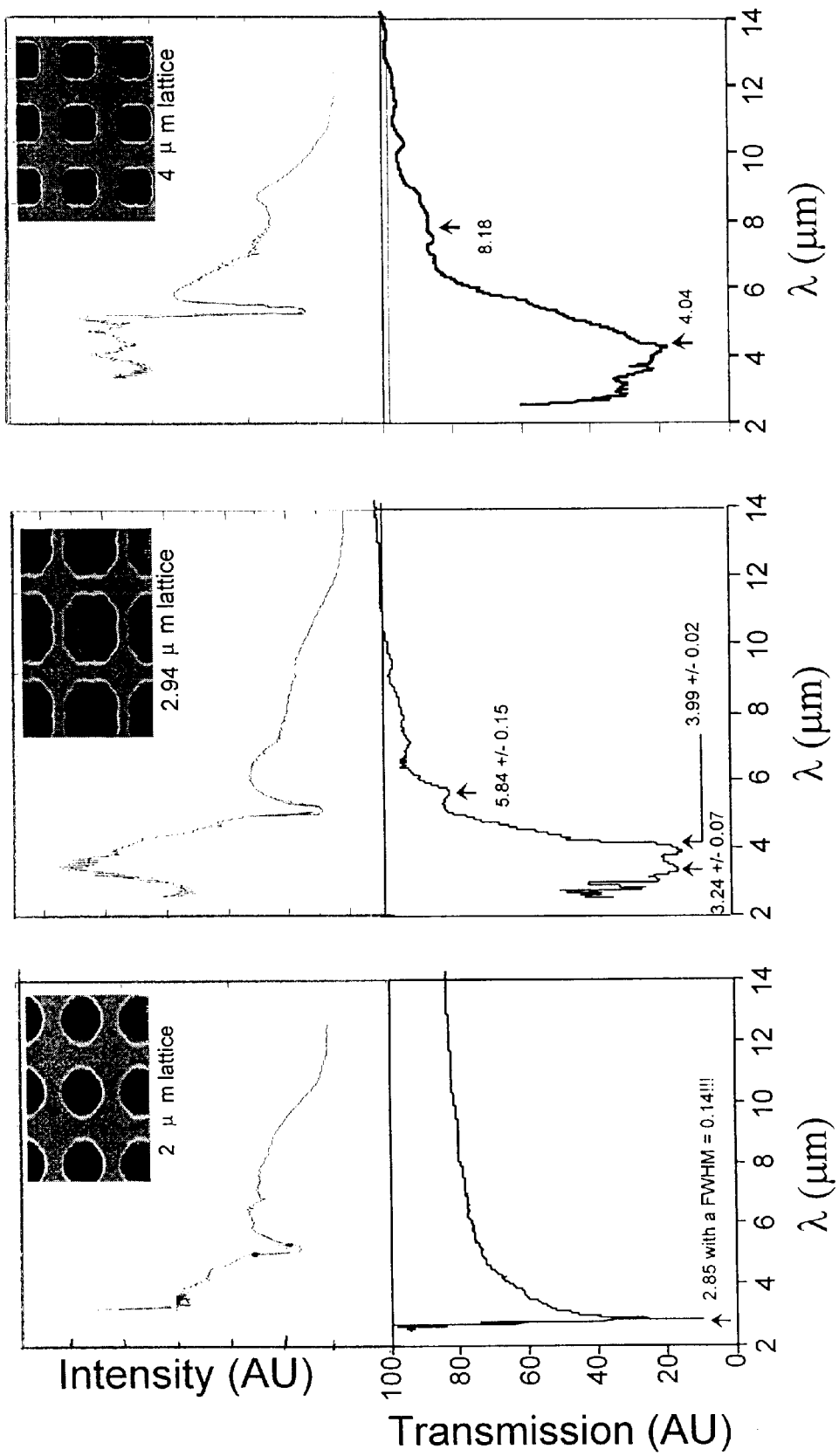
FIG. 6a is a comparative graphical representation of the infrared emission and detection properties of the present invention.
FIG. 6b is a comparative graphical representation of the infrared emission and detection properties of the present invention.
FIG. 6c is a comparative graphical representation of the infrared emission and detection properties of the present invention.

While the previous examples have shown that the linewidth and wavelength of the emission radiation 26 can be controlled by varying the size and spacing of cross-shaped dielectric array features 24, FIGS. 6a to 6c demonstrate that the wavelength and linewidth of emission radiation 26 can also be controlled by utilizing differently shaped dielectric array features 24. The three emitter/detector elements 14, shown schematically, are etched in a 500 nm gold layer deposited on a silicon substrate. The square hole dielectric array features 24 are etched 5 $\mu m$ deep having 2.0, 2.94 and 4.0 $\mu m$ lattice spacing respectively. Emittance measurements were taken at room temperature and show peak intensities at 2.85, 3.24 and 4.04 $\mu m$ respectively. This is in contrast to the peak intensities found for dipole cross shaped dielectric array features which lie between ~5 to 8 $\mu m$. Thus, FIGS. 6a to 6c illustrate that varying the shape of the dielectric array feature 24 can also alter the properties of the emission radiation 26. Although the previous examples have shown the effect of varying the size and spacing of dipole cross and square hole dielectric array features 24, it should be understood that any size, shape and spacing of dielectric array feature 24 can be utilized to provide an emission radiation 26 useful for spectroscopic measurement. Moreover, although the previous examples have all utilized a single uniformity shaped dielectric array feature 24, a mixture of differently shaped and sized features could be utilized in a single periodic dielectric array 22.

Determination of an appropriate shape, size and spacing of dielectric array features 24 for a specific emitter/detector element 14 can be determined via any traditional theoretical electrodynamic calculation method, such as, for example the Transfer Matrix Method (TMM). TMM calculates the transmission and reflection of electromagnetic waves incident on a finite thickness slab of periodic band gap material that is periodic in the other two dimensions. Maxwell's equations are integrated to relate the incident fields on the slab with the outgoing fields. The calculation is repeated for different frequencies, to obtain the entire frequency-dependent response. The transmission and reflection from metal patterns on silicon or etched silicon structures can be calculated with the TMM method and the realistic absorption of the metal at infrared wavelengths used. TMM calculations can also incorporate frequency dependent real and imaginary components of the dielectric function of silicon as well. Utilizing TMM, the emittance of the emitter/detector element 14 as a function of wavelength is calculated by combining the transmission function of the filter with the emissivity of the IR-source to determine the emission bands for the particular surface texture.

Figure 7:
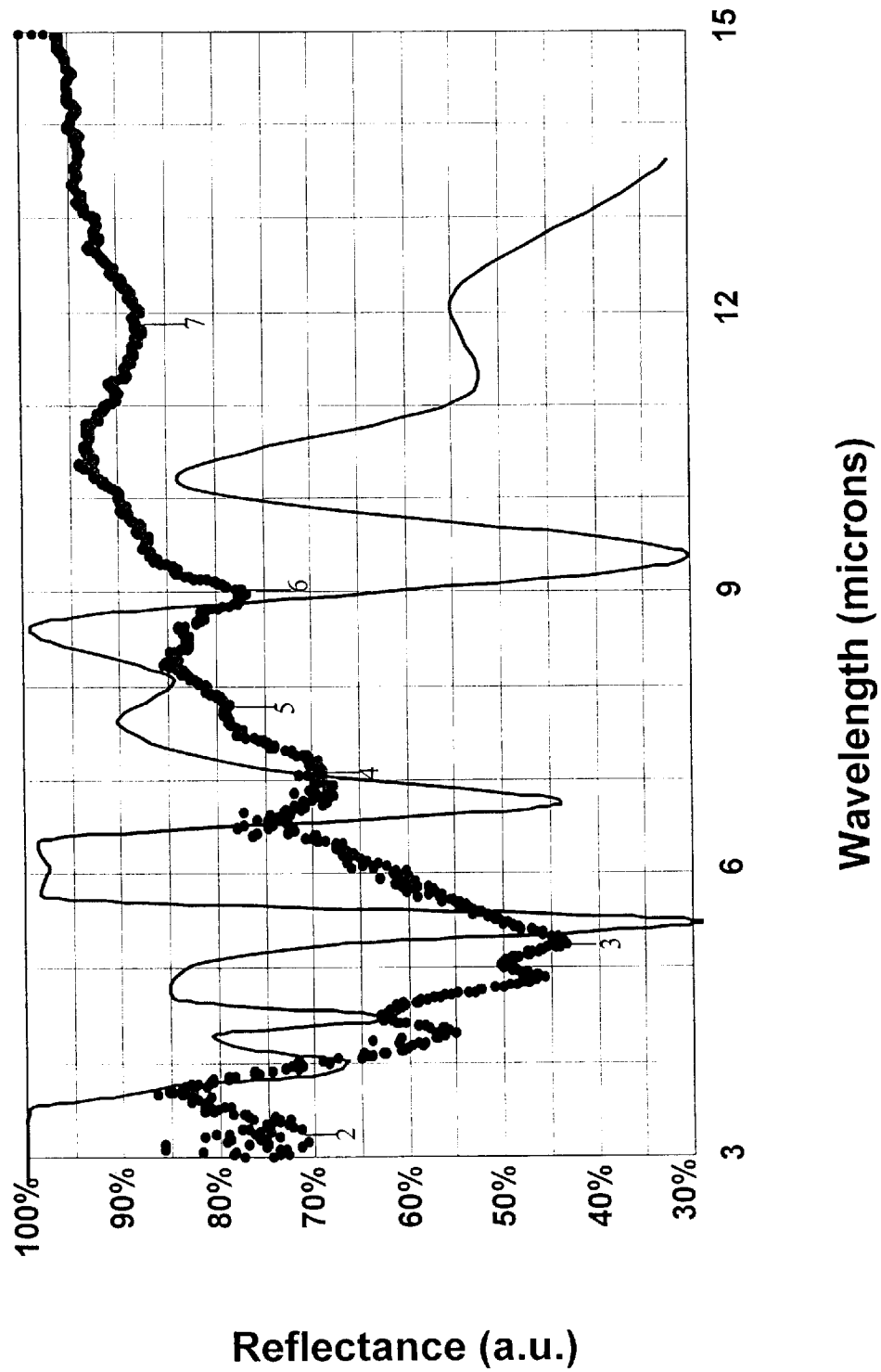
FIG. 7 is a comparative graphical representation of the infrared emission and detection properties of the present invention.
Figure 8A:
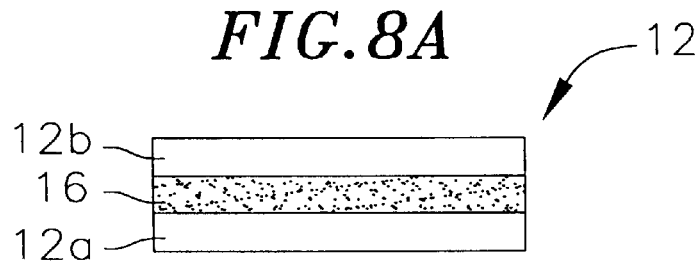
FIG. 8a is a cross-sectional of one step of the manufacturing process for the infrared sensor according to the invention.
Figure 8B:
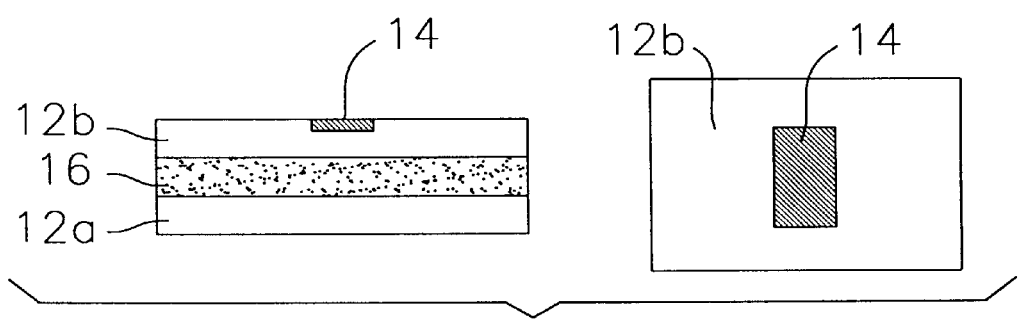
FIG. 8b is a cross-sectional and top view of one step of the manufacturing process for the infrared sensor according to the invention.
Figure 8C:
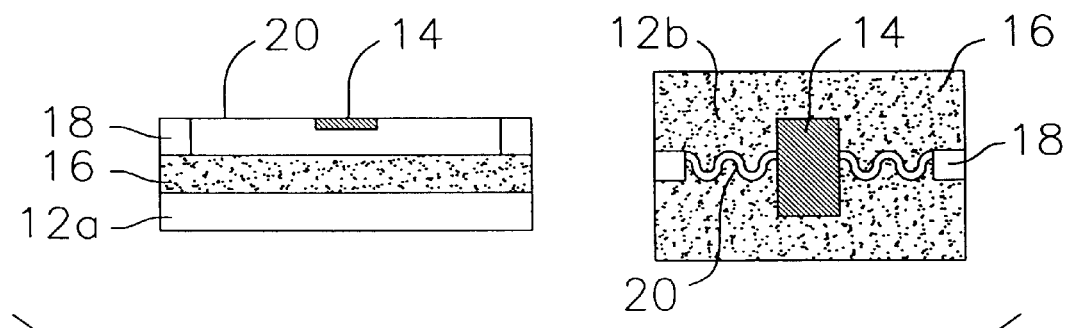
FIG. 8c is a cross-sectional and top view of one step of the manufacturing process for the infrared sensor according to the invention.
Figure 8D:
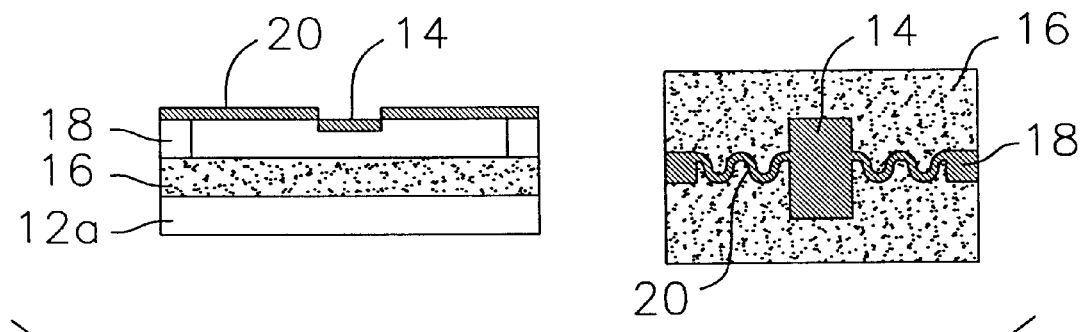
FIG. 8d is a cross-sectional and top view of one step of the manufacturing process for the infrared sensor according to the invention.
Figure 8E:
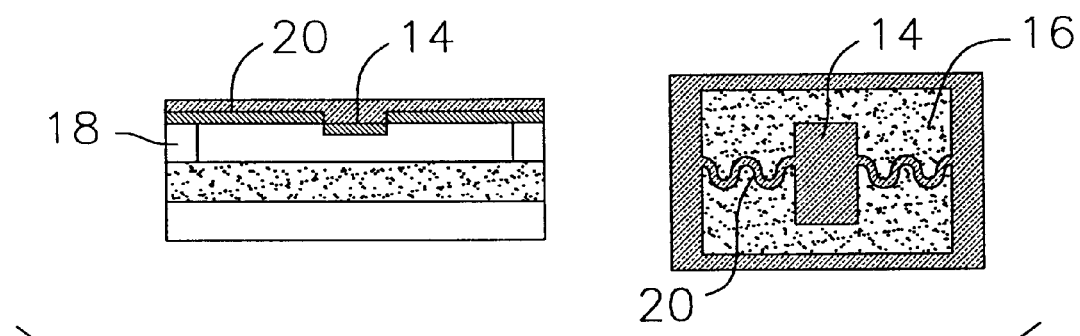
FIG. 8e is a cross-sectional and top view of one step of the manufacturing process for the infrared sensor according to the invention.
Figure 8F:
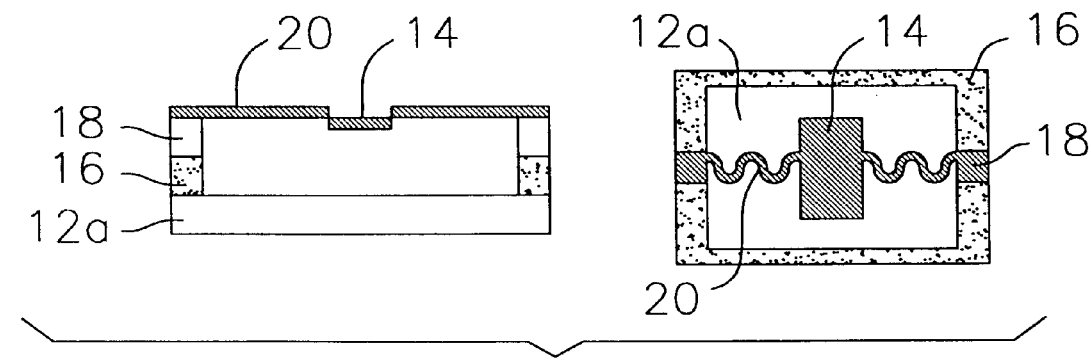
FIG. 8f is a cross-sectional and top view of one step of the manufacturing process for the infrared sensor according to the invention.

FIG. 7 shows the result of a comparative spectrum of the measured and calculated absorption spectra for a dielectric array 22 comprising dipole cross dielectric array features 24 having dimensions of 4.1 $\mu m$ long, 1.9 $\mu m$ wide, with a 1.0 $\mu m$ cross-to-cross separation etched into a thick silicon substrate. The absorbance spectrum was measured at room temperature by Fourier Transform Infrared Spectroscopy. Reflectance, transmittance and absorbance of the 3-dimensional multilayer stack was also calculated using TMM simulations on a multi-processor parallel computing system, a coarse grid of 5 THz was used to evaluate the general features with a resolution of ±0.5 $\mu m$. The dotted line depicts the spectroscopic data and the solid line depicts the calculated data. A comparison of the measured peak location compared to the calculated peak location is shown in Table 2.

TABLE 2

Comparison of Measured and Calculated Absorption Peaks

| Peak # | Data ($\mu$m) | Calculated ($\mu$m) |
| --- | --- | --- |
| 1 | 2.55 (not shown) | 4.03 |
| 2 | 3.20 | 4.48 |
| 3 | 5.15 | 5.50 |
| 4 | 7.05 | 6.74 |
| 5 | 7.80 | 8.10 |
| 6 | 8.95 | 9.38 |
| 7 | 11.80 | 11.11 |

As shown, despite the relative complexity of the dielectric array feature 24 shape; the limited resolution of the calculation ~0.5 $\mu$m; the fact that, due to diffusion-limited etching, features that are sharp in the calculated emitter/detector elements 14 are rounded in the actual dielectric array 22; and due to the absence of a reflective surface coating in the calculation, there is good agreement between the actual and calculated values, most falling within ~1.0±0.5 $\mu$m error range. Accordingly, while the current calculations relate only to a surface having dipole cross shaped dielectric array features 24, it should be evident that a conventional TMM calculation will yield sufficient information about the wavelength and linewidth of the emission radiation 26 emitted from an emitter/detector element 14 having dielectric array features 24 of a specific shape, size and spacing to allow the construction of an emitter/detector element 14 having dielectric array elements 24 of any shape, size and spacing such that a spectroscopically useful emission radiation 26 is generated.

While conventional TMM calculations are utilized in the present embodiment of the invention, it should be understood that any suitable modeling system can be utilizes, such as, for example, finite difference time domain (FDTD) simulations for determining the electromagnetic response of 3-dimensional structures, and the photonic band structure method for computing the gaps and pass-bands of periodic dielectric structures. It should also be recognized that performing TMM calculations for waves incident at different angles, would enable the calculation of the emission pattern from a proposed emitter/detector 14 as a function of angle away from the normal. Accordingly, various periodic dielectric arrays 22 and dielectric array features 24 can be rapidly evaluated with the transfer matrix method and the best performing structure can be selected for fabrication.

In a preferred embodiment, dielectric array features 24 having sizes as small as 0.5 $\mu$m are utilized to obtain emission radiation 22 having wavelengths useful for spectroscopy (~2 to 14 $\mu$m). In another preferred embodiment the dielectric array elements 24 are formed into metallized cross-shaped pillars etched in a silicon substrate, having average periodic dielectric feature sizes in a range between about 0.5 and 10.0 $\mu$m and more preferrably having feature sizes in a range between about 5.7 to 9.5 $\mu$m.

This invention is also directed to a process for forming the micromachined infrared emitter bolometer detector 10 depicted in FIGS. 1 to 3 utilizing a microelectromechanical systems or (MEMS) technology. There are two parts to manufacturing the emitter/detector element 14 of the present invention utilizing a MEMS manufacturing method; the actual manufacturing process, and the mask design. FIGS. 8a to 8f, show one embodiment of the method for making the emitter/detector element 14 according to the present invention, including the number of photolithographic steps required, and how the heater element is separated from the substrate. The basic sequence, as shown, include: (8a) examining and cleaning a starting substrate comprising, in the embodiment shown, three layers, a first and second semiconducting layer 12a and 12b separated by a separate insulating layer 16; (8b) modifying the surface to form the emitter/detector element 14 via an electron beam mask; (8c) depositing the photoresist and pattern resist etch metal for the periodic dielectric array 22 of the emitter/detector element 14 and the contacts 20 and bus bar 18 and etching the pattern into the semiconductor top layer; (8d) metallizing the contacts 20 and bus bars 18 via a pattern liftoff method; (8e) depositing the photoresist and pattern for undercutting the emitter/detector element 14 and the contacts 20; (8f) etching the substrate to undercut the emitter/detector element 14 and the contacts 20 to free the emitter/detector element 14. Although this embodiment only shows an etching process which undercuts the insulating oxide layer, it should be understood that additional etching may be performed to create deeper undercuts and/or etching of entire silicon wafer below heater such that insulation between the emitter/detector element 14 and the semiconducting substrate 12a is increased.

While the above embodiment exemplifies a method for forming the emitter/detector element 14 of the present invention utilizing a conventional MEMS process, any manufacturing process suitable for forming the sub-micron dielectric array features 24, such as, for example, wafer bonding and etch-back may be utilized. In the wafer bonding and etch-back process a silicon wafer substrate 12 has a very thick oxide layer deposited or thermally grown on the surface. This thick oxide layer is then covered by a thin silicon nitride layer. The emitter/detector element 14 is deposited and fabricated on this silicon nitride layer. The surface of the emitter/detector element 14 is then covered by resist, and the back of the silicon wafer substrate 12 is removed chemically leaving only a "frame" to support the devices. When utilizing this approach, the heated element is preferably not close to the support substrate 12. In an alternative embodiment, the rear facing surface of the emitter/detector element 14 is a coated metal support which reflects almost all of the IR light, increasing efficiency and reducing thermal transfer to the support substrate 12.

To produce the emitter/detector element 14 of the present invention utilizing the method disclose above, three photoresist masks must be created, one for the periodic dielectric array structure 24 for the emitter/detector element 14, one for the coarse emitter/detector element 14 geometry, and one to etch vias for release of the emitter/detector element 14 from the substrate. The optical masks required to process the periodic dielectric array 22 and emitter/detector element 14 can be designed and fabricated utilizing any conventional method, such as, for example, designed using CAD software and fabricated using electron-beam lithography.

Dielectric array features 24 with sub-micron resolution, may be made utilizing any suitable sub-micron manufacturing process, such as, for example, via projection alignment masks on a GCA stepper projection aligner and transferred to silicon wafers covered with a suitable photoresist via either contact or projection alignment.

The emitter/detector element 14 can be fabricated utilizing any suitable substrate material, such as, for example, silicon. In a preferred embodiment, a single-crystal silicon substrate having very high thermal coefficient of resistance (TCR) is utilized for the emitter/detector element 14. Although silicon TCR values vary with doping, doping effects are minimal at high temperatures where intrinsic carrier concentrations dominate and high resistance silicon has a carrier concentration that is exponentially dependant upon temperature and therefore a very high TCR. Moreover, the coefficient DR/R per degree is more than a factor of ten greater than the coefficient for Ti, 0.5% average over the range room temperature to 500° C. In a particularly preferred embodiment, substantially defect free silicon rather than polycrystalline silicon is utilized as a substrate in the emitter/detector element 14. Although polycrystalline silicon has sufficiently high TCR values, defects such as dislocations and grain boundaries in polycrystalline silicon films could produce noise in resistance measurements. In addition, the relative roughness of the surface of thick polycrystalline material makes it difficult to perform the high resolution lithography needed to form the sub-micron dielectric array features 24 utilized in the present invention. In a particularly preferred embodiment, the emitter/detector element 14 is fabricated on a ~3 to 4 inch diameter Silicon on Insulator (SOI) wafer. The silicon films grown over oxide insulators in SOI wafers exhibit very high crystalline quality with a very smooth surface and few defects. Although SOI materials are discussed above, any suitable material can be utilized to make the emitter/detector elements 14 of the present invention, such as, for example, thick epitaxial silicon on single crystal wafers with highly doped layers as etch stops, metallic layers such as nichrome, or polycrystalline silicon for the heater.

Figure 9:
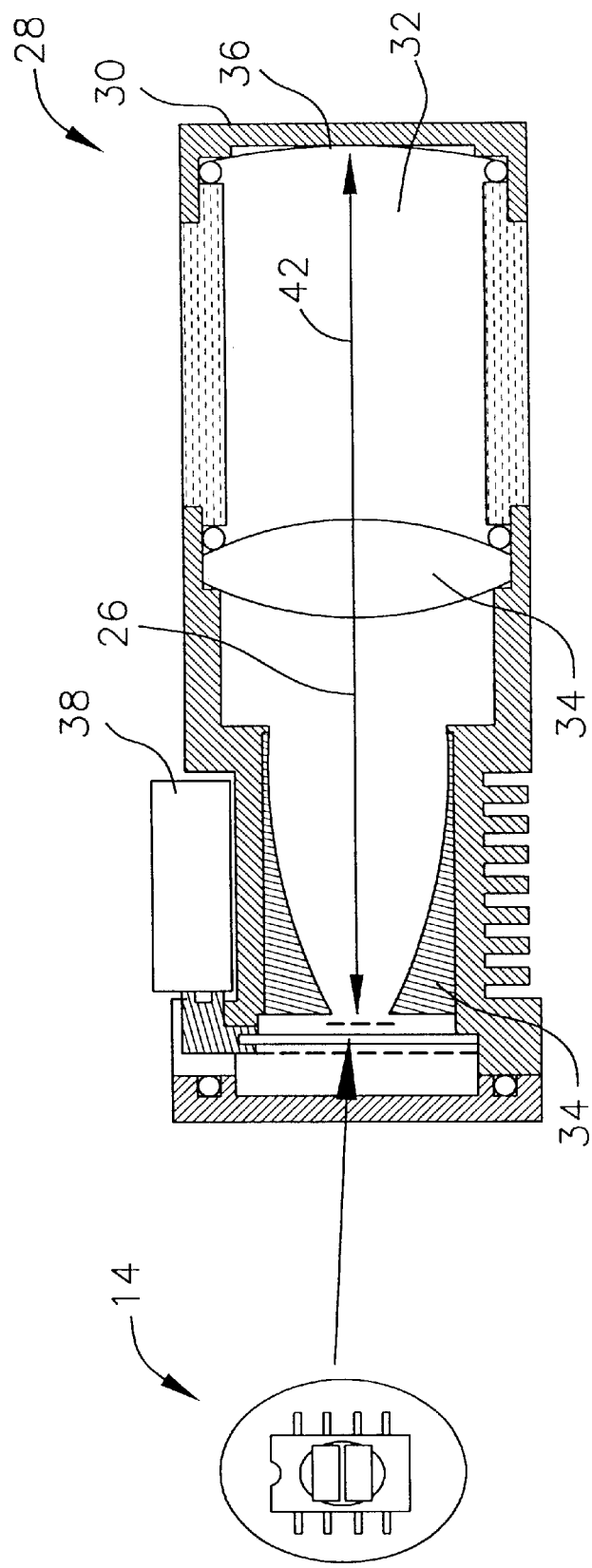
FIG. 9 is a schematic view of an embodiment of the infrared sensor according to the invention.

In one embodiment, as shown in FIG. 9, the micromachined infrared emitter bolometer sensor device 28 comprises a porous optical cell 30 defining an inner volume 32 containing an emitter/detector 14 designed to emit a beam of infrared radiation and detect the equilibrium temperature of the reflected infrared radiation, a collimator 34 adapted to collimate and focus the infrared beam, a reflector 36 in line-of-sight with the emitter/detector, an internal or external power source 38 in electrical communication with the emitter/detector 14 and either an internal or external monitor (not shown) in signal communication with the emitter/detector 14 adapted to communicate the signal to a user. The power source 38 can comprise any suitable energy source capable of supplying sufficient power to operate the sensor 28, such as, for example, a power supply line connected directly to an external source or a rechargeable or disposable battery. The power supply 38 may also contain a backup battery or power source, not shown, to ensure operation if the primary power supply 38 were to fail. The signal monitor system can comprise any suitable digital signal processor capable of measuring the signal change from the emitter/detector 14 and transmitting that information to the user, such as, for example, a printed circuit board having a pre-amplifier, an AD converter and driver circuit, and a programmable chip for instrumentation specific software; or a multichip module comprising those elements.

Figure 10:
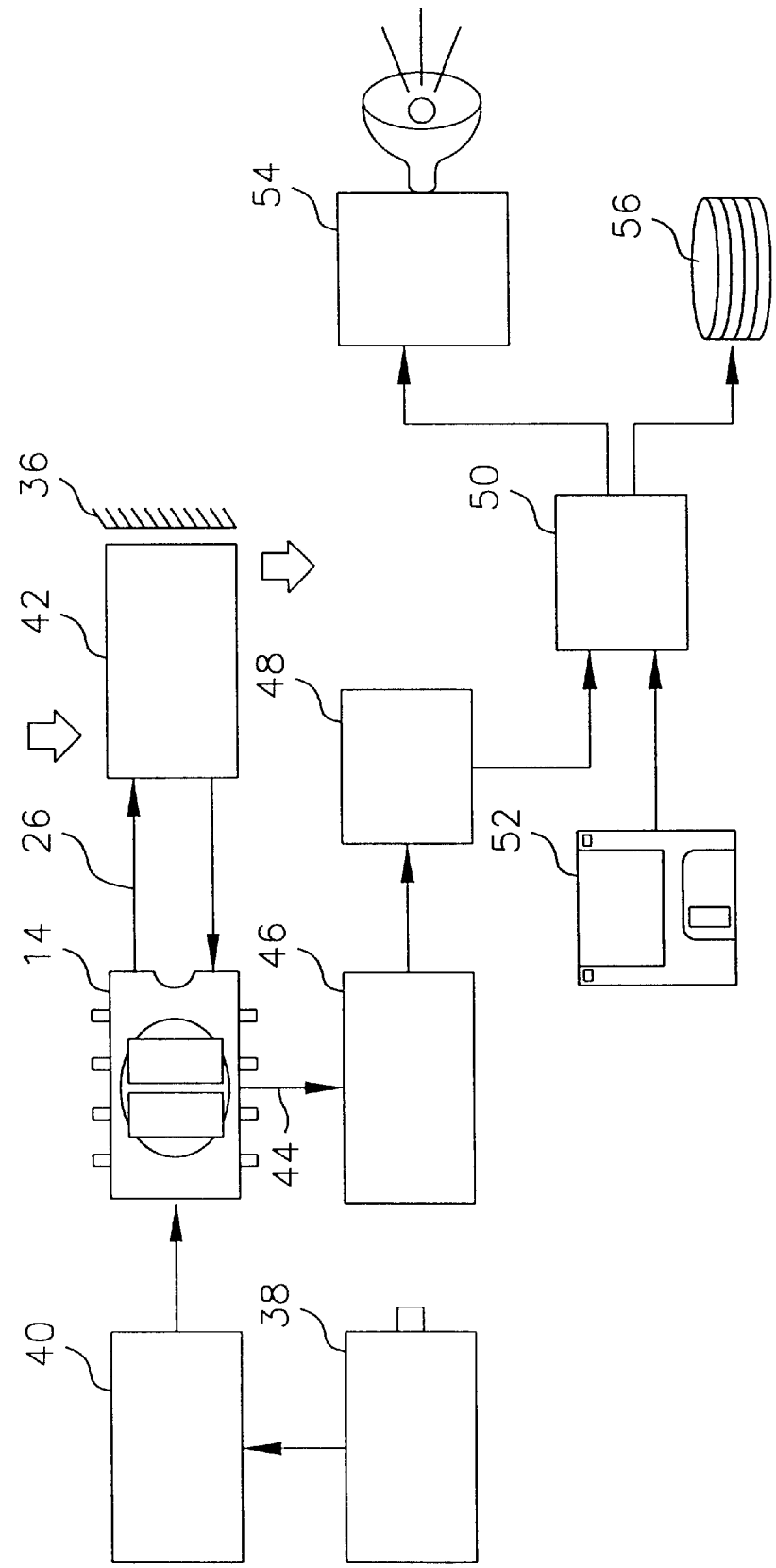
FIG. 10 is a schematic view of an embodiment of the infrared sensor system according to the invention.

FIG. 10 shows the interrelation of the above components, including the signal monitor system, in one embodiment of the infrared gas sensor 28. The power supply 38 supplies power to a drive circuit 40 which in turn drives the narrow-band emitter/detector 14, heating the element to produce a narrow-band infrared emission 26 which is projected through the optical path 42 to a reflector 36 whereupon the infrared emission 26 is reflected back onto the emitter/detector 14. The signal 44 generated by the infrared emission 26 impinging on the emitter/detector 14 is transmitted to a pre-amp 46 in signal communication with the emitter/detector 14 which amplifies the signal 44 and then transmits the signal 44 to an A/D converter 48 in signal communication with the pre-amp 46. The A/D converter 48 converts the amplified signal 44 from analog to digital format and transmits the signal 44 to a digital signal processor 50. The digital signal processor 50 then analyzes the digital signal 44 according to a set of instructions and parameters supplied by instrument specific software 52 to determine whether or not the user notification device 54 should be triggered. In an alternative embodiment a data storage device 56 could also be supplied to store the data from the digital signal processor 52 for later analysis.

In operation, the infrared gas sensor 28 shown in FIGS. 9 and 10 functions as follows: a narrow-band infrared emission 26 generated by the emitter/detector 26, is projected out of the emitter/detector 14, is collimated and focused by the collimator 34, and is directed across the inner volume optical path 42 to the reflector 36, is reflected back through the inner volume optical path 42, is collimated and refocused by the collimator 34 onto the emitter/detector 14 where the equilibrium temperature of the infrared emission 26 is measured by the emitter/detector 14 and the signal 44 is transmitted in series to the pre-amp 46, A/D 48 and digital signal processor 50. Gas from the surrounding environment 58 enters the inner volume optical path 42 through the porous cell body 30 and interacts with the infrared emission 26. In the absence of a species that absorbs in the wavelength of the infrared emission 26, the emitter/detector 14 reaches radiative equilibrium with its surroundings. The presence of an absorbing gas in the optical path of the infrared emission 26 frustrates the infrared emission 26 re-imaging on the emitter/detector 14 so that it reaches a lower equilibrium temperature. This temperature change is detected by the emitter/detector 14 and a signal 44 is sent to the digital signal processor 50 which alerts the user via the user indicator means 54.

The porous optical cell 30 can comprise any suitable body defining an inner volume 32. In one preferred embodiment, shown in FIG. 9, the porous optical cell comprises an outer body 30 having a series of openings 31 along the optical path 42 of the infrared emission 26 to allow gas from the surrounding environment to enter the sensor optical path 42 and interact with the infrared emission 26. Any material which provides insulation from external thermal noise may be used, such as, for example, insulated sintered metal or plastic.

The collimator 34 can comprise any reflective optic suitable for collimating a the infrared emission 26 from the emitter/detector 14 into a collimated beam of infrared radiation, such as, for example, a compound parabolic concentrator. Likewise the reflector 36 can comprise any suitable reflecting optic capable of reflecting the infrared emission 26 from the emitter/detector 14 back along the optical path to the collimator 34. Any suitable material can be used to construct the collimator 34 and reflector 36 reflective optics, such as, for example, molded plastic or glass having a reflective coating.

The detection electronics can comprise and combination components suitable for detection of small changes in the emitter/detector element 14 resistance, such as, for example, a wheatstone bridge. Likewise, the pre-amp 46, A/D converter 48, digital signal processor 50 and indicator means 52 comprise any suitable commercial electronic capable of suitably processing the signal 44 generated by the resistance change in the emitter/detector element 14. These signal electronics elements can be integrated onto a single miniaturized printed circuit board or alternatively into a multichip module. The emitter/detector element 14 of the present invention can be incorporated into the gas sensor body by any suitable means, such as, for example, mounted in a typical transistor header (e.g. TO8 or DIP packages). In embodiments utilizing transistor header mounts for the emitter/detector element 14, a preferred die size will be on the order of 5 mm by 5 mm.

Figure 11:
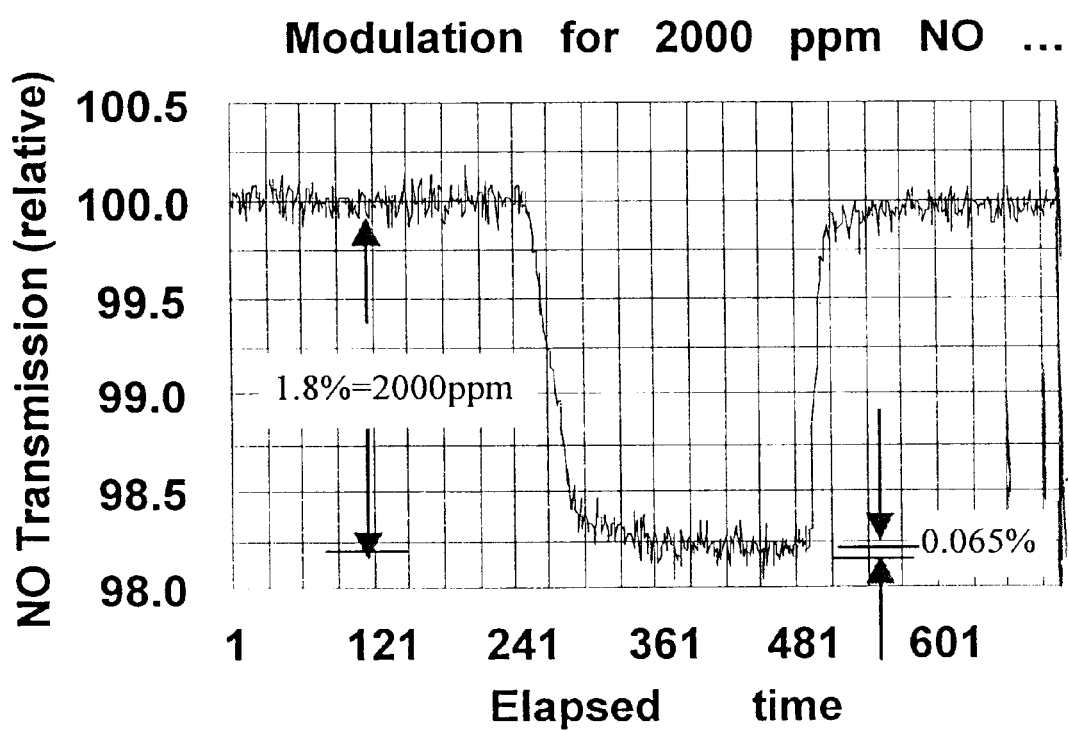
FIG. 11 is a graphical representation of the infrared emission and detection properties of the present invention.

A prototype of the gas sensor system 28, shown in FIG. 9 and described above, was constructed. The emitter/detector element 14 for the prototype was fabricated according to the design shown in FIGS. 1a to 1c, using four straight 1 cm dielectric array features 24. A constant voltage drive circuit 40 was utilized to supply power to the emitter/detector element 14. Results from absorption spectrum taken for the instrument is shown in FIG. 11. As shown, pulse-to-pulse repeatability of 6 parts in 10,000 at 10 Hz was obtained, demonstrating a signal-to-noise ratio high enough to detect NO gas (a weak IR absorber) in concentrations as low as 70 ppm, or alternatively, to detect concentration changes as low as 20 ppm for a strong IR absorber such as CO in a porous cell body 30 having a 3-inch long optical path 42. Although the detection ranges above were calculated for a 3-inch long optical path 42, even lower concentrations could be resolved by using longer path lengths and/or integrating the signal 44 over several pulses.

Although the gas detectors 28 disclosed above, are only designed to emit in a single, narrow wavelength band, targeting a specific gas (e.g. CO, methane, etc.), it should be understood that a gas detector 28 could be constructed containing two or more emitter/detector elements 14, emitting at two different wavelengths. It will be understood that such a design would enable one to make ratio measurements and that by measuring the ratio of the response at two or more different wavelengths, any bias or error due to dust or other contaminants in the atmosphere could be factored out using conventional means.

Although specific embodiments are disclosed herein, it is expected that persons skilled in the art can and will design alternative emitter/detector elements, methods to produce emitter/detector elements and/or sensor systems that are within the scope of the following claims either literally or under the Doctrine of Equivalents.

What is claimed is:

1. A sensor engine for producing an electromagnetic emission and detecting a change in the equilibrium temperature of the sensor engine, comprising: a sensor engine having a temperature and comprising a substrate surface adapted to emit an electromagnetic emission, the substrate surface having emission features disposed thereon, the emission features having a periodic array structure such that the emission features interact with the electromagnetic emission as a photonic bandgap structure filtering the electromagnetic emission to provide the electromagnetic emission with a narrow spectral bandwidth, the sensor engine being made from a material having a non-zero temperature coefficient of resistivity.

2. The sensor engine according to claim 1 wherein the substrate is made of a metallized single-crystal semiconductor.

3. The sensor engine according to claim 1 wherein the substrate is made of single-crystal silicon coated with a metal selected from the group consisting of gold, aluminum and titanium.

4. The sensor engine according to claim 1 wherein the substrate is made of silicon deposited on an insulator.

5. The sensor engine according to claim 4 wherein the insulator is an oxide material.

6. The sensor engine according to claim 1 wherein the emission features have a shape selected from the group consisting of crosses, squares, circles, pyramids and rectangles.

7. The sensor engine according to claim 1 wherein at least two differently shaped emission features are disposed on the substrate surface.

8. The sensor engine according to claim 1 wherein the emission features have a cross-sectional dimension of about 0.1 to 10.0 $\mu$m.

9. The sensor engine according to claim 1 wherein the emission features have a lattice spacing of about 0.1 to 10.0 $\mu$m.

10. The sensor engine according to claim 1 wherein the electromagnetic emission has a wavelength of between about 2 to 14 $\mu$m.

11. The sensor engine according to claim 1 wherein the bandwidth of the electromagnetic emission is about 0.1 to 0.5 $\mu$m.

12. The sensor engine according to claim 1 wherein the electromagnetic emission is produced by resistively heating the sensor engine.

13. The sensor engine according to claim 12 wherein the temperature of the heated sensor is between about 300 and 550° C.

14. The sensor engine according to claim 1 wherein the periodic array structure is non-random.

15. A method for producing a sensor engine according to claim 1 utilizing a microelectromechanical process comprising the steps of:
    supplying a metallized substrate;
    depositing a photoresist on the substrate;
    exposing a pattern comprising the emission features having a non-random periodic array structure on the photoresist;
    reactive ion etching the substrate to form the emission features such that the emission features interact with the electromagnetic emission as the photonic bandgap structure; and
    removing the photoresist.

16. The method according to claim 15 wherein the step of exposing includes forming the pattern by direct write e-beam lithography.

17. The method according to claim 15 wherein the metallized substrate is a single-crystal silicon substrate coated with a metal selected from the group consisting of gold, aluminum and titanium.

18. A gas sensor for detecting the presence of a specific species comprising:
    an optical cell in fluid communication with the environment having proximal and distal ends;
    a sensor engine fixedly mounted to the proximal end of the optical cell the sensor engine having a temperature and comprising a substrate surface adapted to emit an electromagnetic emission having a flux, the substrate surface having emission features disposed thereon, the emission features having a periodic array structure such that the emission features interact with the electromagnetic emission as a photonic bandgap structure, filtering the electromagnetic emission to provide the electromagnetic emission with a narrow spectral bandwidth, the sensor engine being made from a material having a non-zero temperature coefficient of resistivity;
    a power supply in electrical communication with the sensor engine for supplying power to the sensor engine;
    a reflector fixedly mounted to the distal end of the optical cell such that the electromagnetic emission travels through the optical cell and is reflected back onto the sensor engine;
    a monitor in signal communication with the sensor engine to detect the temperature of the sensor engine and communicate a change in the temperature of the sensor engine to a user.

19. The gas sensor according to claim 18, further comprising a focusing optic mounted to the proximal end of the optical cell, distal to the sensor engine such that the electromagnetic emission emitted from or impinging on the sensor engine is focused by the focusing optic.

20. The gas sensor according to claim 19, wherein the focusing optic is a compound parabolic concentrator.

21. The gas sensor according to claim 18, wherein the substrate is made of a metallized single-crystal semiconductor.

22. The gas sensor according to claim 18, wherein the substrate is made of single-crystal silicon deposited on an insulator.

23. The gas sensor according to claim 18, wherein the emission features have a shape selected from the group consisting of crosses, squares, circles, pyramids and rectangles.

24. The gas sensor according to claim 18, wherein at least two differently shaped emission features are disposed on the substrate surface.

25. The gas sensor according to claim 18, wherein the electromagnetic emission has a wavelength between about 2 and 14 $\mu$m.

26. The gas sensor according to claim 18, wherein the bandwidth of the electromagnetic emission is between about 0.1 to 0.5 $\mu$m.

27. The gas sensor according to claim 18, wherein power supply is a battery.

28. The gas sensor according to claim 18, wherein the monitor in part comprises a wheatstone bridge adapted to measure the temperature of the sensor engine.

29. The gas sensor according to claim 18, wherein the monitor in part comprises an audible alarm adapted to communicate a temperature change in the sensor engine to the user.

30. The gas sensor according to claim 18 wherein the optical cell has a length of about 1 to 12 inches.

31. The gas sensor according to claim 18 wherein the electromagnetic emission has a wavelength corresponding to the wavelength of absorption of a species selected from CO, NO and methane.

32. The gas sensor according to claim 18 comprising at least two sensor engines adapted to produce at least two electromagnetic emissions having at least two different wavelengths and wherein the monitor is adapted to independently monitor and compare the temperatures of the at least two sensor engines to determine whether a contaminant is present in the optical cell.

33. The gas sensor according to claim 18 wherein the electromagnetic emission is produced by resistively heating the sensor engine.

34. The gas sensor according to claim 33 wherein the temperature of the heated sensor is between about 300 and 550° C.

35. The gas sensor according to claim 18 wherein the periodic array structure is non-random.

36. A method of detecting a gas species comprising the steps of:

providing a sensor engine having a temperature and comprising a substrate surface adapted to emit an electromagnetic emission, the substrate surface having emission features disposed thereon, the emission features having a periodic array structure such that the emission features interact with the electromagnetic emission as a photonic bandgap structure, filtering the electromagnetic emission to provide the electromagnetic emission with a narrow spectral bandwidth, the sensor engine being made from a material having a non-zero temperature coefficient of resistivity;

applying power to the sensor engine such that the sensor engine projects the electromagnetic emission having the narrow spectral bandwidth and a flux from the substrate surface across a detection region such that in the presence of a species of interest having an absorption region in the narrow spectral bandwidth of the electromagnetic emission, the flux of the electromagnetic emission is reduced;

reflecting the electromagnetic emission back toward the sensor engine such that it impinges on the sensor engine; and measuring the temperature of the sensor engine such that a change in the temperature of the sensor engine is communicated to a user.

37. A method according to claim 36 wherein the temperature of the sensor engine depends on the flux of the reflected electromagnetic emission impinging on the sensor engine.

* * * * *

UNITED STATES PATENT AND TRADEMARK OFFICE
CERTIFICATE OF CORRECTION

PATENT NO. : 6,756,594 B2
DATED : June 29, 2004
INVENTOR(S) : George et al.

It is certified that error appears in the above-identified patent and that said Letters Patent is hereby corrected as shown below:

Title page,
Item [56], References Cited, OTHER PUBLICATIONS, "National Research Council" reference, delete "National Research Council, Estimating losses from future earthquakes; National Academy Press, Washington, D.C., 1989; pp. 61-63."
"Markus, Karen et al." reference, delete "Markus, Karen et al.; MEMS: A Closer Look; Jun. 1996; Sensors; pp. 4-7."
Item [57], ABSTRACT,
Line 4, delete "band gap", insert -- bandgap --
Line 8, delete "band gap", insert -- bandgap --

Column 16,
Line 62, after "sensor engine;", insert -- and --

Signed and Sealed this

Twenty-eighth Day of June, 2005

JON W. DUDAS
*Director of the United States Patent and Trademark Office*